(12) United States Patent
Bladow et al.

(10) Patent No.: US 7,108,303 B2
(45) Date of Patent: *Sep. 19, 2006

(54) CRUSHED PROFILE BUMPER AND METHOD FOR PRODUCING

(75) Inventors: Jeffrey L. Bladow, West Bloomfield, MI (US); Walter D Jaeger, Lake Angelus, MI (US)

(73) Assignee: Pullman Industries, Inc., Troy, MI (US)

( * ) Notice: Subject to any disclaimer, the term of this patent is extended or adjusted under 35 U.S.C. 154(b) by 60 days.

This patent is subject to a terminal disclaimer.

(21) Appl. No.: 10/853,404

(22) Filed: May 25, 2004

(65) Prior Publication Data

US 2005/0225101 A1 Oct. 13, 2005

Related U.S. Application Data

(60) Provisional application No. 60/560,064, filed on Apr. 7, 2004.

(51) Int. Cl.
*B60R 19/03* (2006.01)

(52) U.S. Cl. ..................... 293/122; 293/102
(58) Field of Classification Search ............... 293/102, 293/120, 121, 122
See application file for complete search history.

(56) References Cited

U.S. PATENT DOCUMENTS

| | | | |
|---|---|---|---|
| 4,762,352 A | 8/1988 | Enomoto | 293/120 |
| 5,306,058 A | 4/1994 | Sturrus | 293/154 |
| 5,395,036 A | 3/1995 | Sturrus | 228/146 |
| 5,577,796 A | 11/1996 | Clausen | 296/202 |
| 5,780,129 A * | 7/1998 | Ohta | 293/102 |
| 5,813,594 A | 9/1998 | Sturrus | 228/146 |
| 5,997,058 A | 12/1999 | Pedersen | 293/102 |
| 6,042,163 A | 3/2000 | Reiffer | 293/155 |
| 6,141,935 A | 11/2000 | Artner | 52/735.1 |
| 6,179,355 B1 * | 1/2001 | Chou et al. | 293/120 |
| 6,217,089 B1 | 4/2001 | Goto | 293/102 |
| 6,343,820 B1 | 2/2002 | Pederson | 293/102 |
| 6,349,521 B1 | 2/2002 | McKeon | 52/735.1 |
| 6,352,297 B1 | 3/2002 | Sundgren | 296/102 |
| 6,510,771 B1 | 1/2003 | Sturrus et al. | 83/54 |
| 6,695,368 B1 | 2/2004 | Weykamp et al. | 293/154 |
| 2004/0007886 A1 | 1/2004 | Hallergren | 293/102 |
| 2004/0169380 A1 * | 9/2004 | Bladow et al. | 293/121 |
| 2005/0213478 A1 * | 9/2005 | Glasgow et al. | 293/122 |

* cited by examiner

*Primary Examiner*—Lori L. Coletta
(74) *Attorney, Agent, or Firm*—Gifford, Krass, Groh, Sprinkle, Anderson & Citkowski, P.C.

(57) ABSTRACT

A formed beam for use as a vehicle bumper having an elongated body exhibiting front and rear opposing surfaces and top and bottom surfaces interconnecting the front and rear surfaces, such that the beam defines a swept shape between first and second opposite ends. A plurality of spaced apart and transverse extending beads are formed upon the top extending surface of said beam and at least a portion of one of the front and rear surfaces are inwardly displaced relative to each other and during formation of an arcuate profile to the beam, and such that the front and rear surfaces exhibit at least partially non-parallel surfaces.

6 Claims, 4 Drawing Sheets

CRUSHED PROFILE BUMPER AND METHOD FOR PRODUCING

CROSS-REFERENCE TO RELATED APPLICATIONS

The present application claims the priority of U.S. Provisional Application Ser. No. 60/560,064, filed Apr. 7, 2004 and entitled "Crushed Profile Bumper."

BACKGROUND OF THE INVENTION

1. Field of the Invention

The present invention relates generally to vehicle bumper beam designs. More particularly, the invention discloses a vehicle bumper design exhibiting a swept profile combined with an inward forming or "crushing" of either or both of the front and rear wall surfaces associated with the bumper. In one particular application, such crushing of opposite front-end walls, in a direction towards the rear bumper end walls, and without affecting the same, enables the bumper to "meet" the fascia in a close tolerance fashion.

2. Description of the Prior Art

The prior art is well documented with examples of roll-formed bumper bars and bumper assemblies, in particular for use as front and rear vehicle bumpers. An object of such bumper assemblies is to provide an arcuate, or swept, profile which matingly engages the vehicle and in order to provide, to the degree possible, seamless alignment with respect to adjoining locations of the vehicle fascia.

U.S. Pat. No. 5,306,058, issued to Sturrus et al., teaches a bumper bar for vehicles which is formed from a rolled sheet steel and includes a closed tubular profile designed to exhibit a high impact resistance, a high strength-to-weight ratio, and a low cost of manufacture. The bar is preferably swept along its longitudinal axis and in to create an overall curvature consistent with modern automotive designs.

U.S. Pat. No. 6,349,521, issued to McKeon et al., teaches a vehicle bumper beam exhibiting a non-uniform cross section. An associated method for producing a bumper bar includes roll-forming and sweeping a tubular beam with a constant longitudinal cross section, and then reforming the tubular beam to form a tubular beam having a non-constant cross section. The non-constant cross section exhibits specific shapes chosen to provide particular structural properties and surfaces along the reshaped beam, as well as to provide a stylized appearance, such that the reformed beam is useful as a vehicle bumper. The reshaped beam also includes integrally formed vehicle mounting structure, angled end sections forming aerodynamic but impact resistant bumper ends, and a high energy absorbing but flexible center section.

U.S. Pat. No. 6,352,297, issued to Sundgren et al., teaches a vehicle bumper bar extended in one dimension, has a closed cross section and two ends and includes at least one front flange, one rear flange, one top side and one bottom side. The bumper bar has at least one part of the rear flange, lying along the bar, in contact with at least one part of the front flange, also lying along the bar. In the method for manufacturing the bar, the at least one part of the rear flange is wholly or partially pressed in towards the at least one part of the front flange.

U.S. Pat. No. 6,042,163, issued to Reiffer, teaches a vehicle bumper bar having a swept B-shaped beam section and one-piece end pieces attached to opposing ends of the beam section for forming a compound angle along a front of the bumper bar. The end pieces are tubular and include circumferentially overlapping flanges that allow the shape of the end piece to be circumferentially adjusted to a best-fit condition on the ends of the beam section. Further included are attachment tabs that longitudinally engage the ends of the beam section. The attachment tabs extend from the end piece longitudinally and circumferentially onto the beam section, in order to provide optimal impact and attachment strength of the end piece on the beam section. A method includes positioning the end piece on an end of the beam section, clamping the end piece onto the end including shaping the end piece circumferentially to a best-fit shape, and securing the end piece to the beam section by welding.

Finally, U.S. Pat. No. 6,695,368, issued to Weykamp et al., teaches a tubular beam having front, top, bottom and rear walls, and further having open tubular ends. The bumper system includes a pair of mounting brackets each having a V-shaped mounting section attached to the rear wall of the open tubular ends and having an integral corner-forming section extending from the mounting section laterally around the associated ends and forwardly to a location where the corner-forming section attaches to the front wall of the one end. The corner-forming section includes a resilient portion shaped to flex and absorb energy upon corner impact, and further is adapted to transfer energy directly to the vehicle frame, thus providing efficient and effective energy absorption upon corner impact.

SUMMARY OF THE PRESENT INVENTION

The present invention discloses a vehicle bumper design, and associated method for forming, exhibiting a swept profile, and combined with an inward forming or "crushing" of either or both of the front and rear wall surfaces associated with the bumper. In one particular application, such crushing of opposite front-end walls, in a direction towards the rear bumper end walls, and without affecting the same, enables the bumper to "meet" the fascia in a close tolerance fashion. In this manner, at least one of the front and rear surfaces exhibits at least one of non-parallel surfaces and/or such surfaces exhibiting non-constant radii at specific locations.

In a preferred embodiment, the vehicle bumper includes an elongated body with front and rear opposing surfaces and interconnected top and bottom surfaces. The associated method of producing includes the steps of unreeling an automotive sheet steel having a strength rating of at least 100 ksi (kips or 1000 lbs/in$^2$), from a material roll. A plurality of spaced apart and transverse extending beads are formed upon selected extending (typically edge) surfaces of the sheet steel and prior to a roll-forming operation whereby the sheet steel is formed into a specified three-dimensional (tubular) and closed cross-sectional shape.

The tubular shaped beam is sectioned at specified intervals, and prior to heat treating such as in a furnace. At this point, an arcuate forming operation is performed upon the individual heated beam sections, and in order to provide the beams with an overall arcuate shape. Combined with the arcuate shaping of the beams, selected locations associated with the front and rear surfaces are inwardly, and opposingly, displaced relative to each other, and so that, upon installation, the bumper beam more seamlessly matches a given profile of a vehicle fascia.

Additional steps may include roll-forming the beam such that it exhibits opposingly extending and central planar sections, these separating upper and lower three-dimensional shaped and tubular portions. The inward displacement of the front and rear bumper surfaces further teaches the formation of inwardly displaced mounting locations in the rear surface and proximate the first and second ends, and such as which permits more closely tolerance mounting to the vehicle front end.

BRIEF DESCRIPTION OF THE DRAWINGS

Reference will now be made to the attached drawings, when read in combination with the following detailed description, wherein like reference numerals refer to like parts throughout the several views, and in which.

DESCRIPTION OF THE PREFERRED EMBODIMENTS

Figures 1, 2:
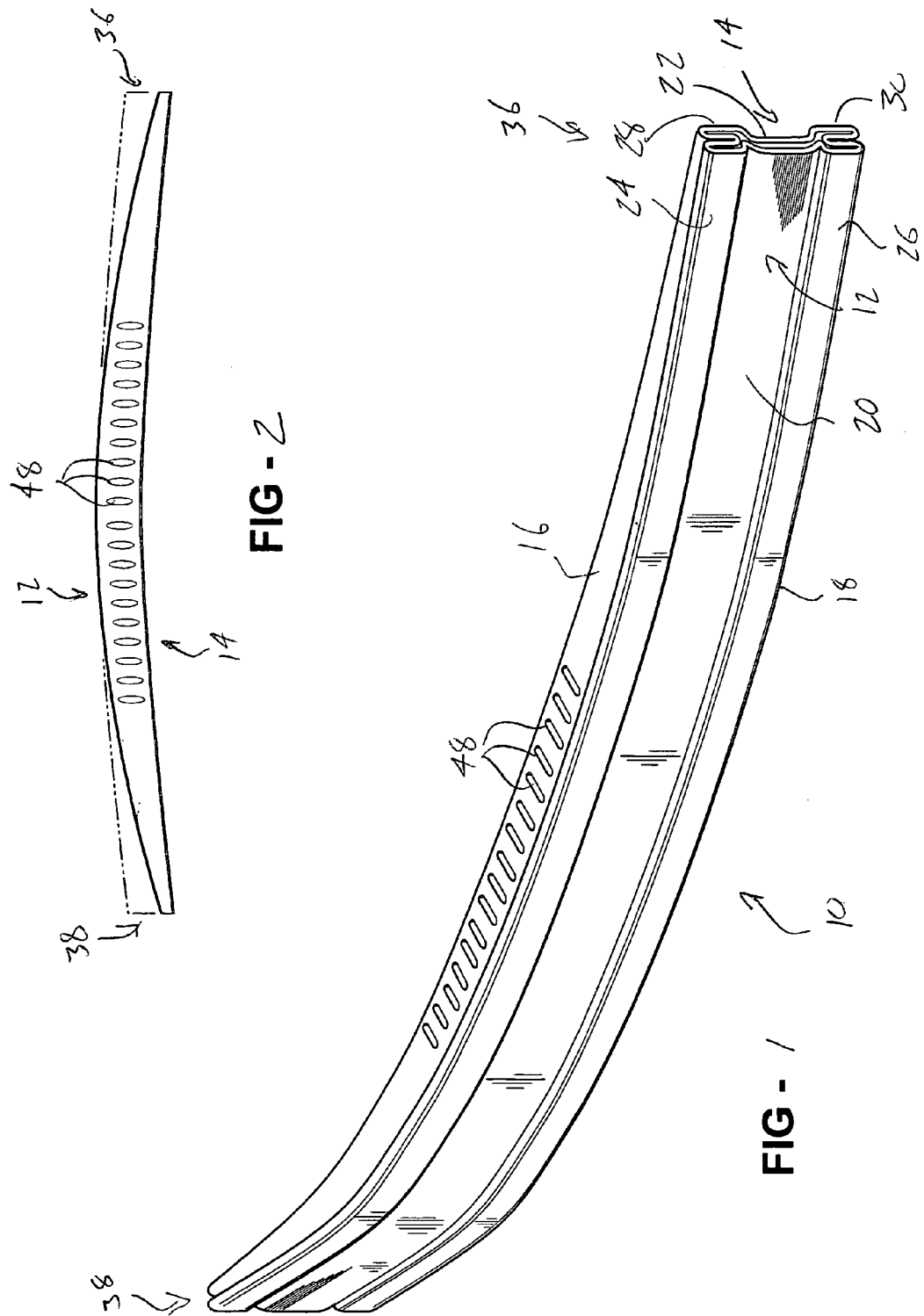
FIG. 1 is a perspective view of a bumper beam design exhibiting first and second crushed end profiles according to the present invention.
FIG. 2 is a top plan view of the bumper beam illustrated in FIG. 1 and evidencing its overall arcuate sweep, in combination with the inward displacement of the front corner surfaces of the beam in a direction towards the associated rear surfaces.

Referring now to FIG. 1, a roll-formed beam is illustrated at 10 according to a preferred embodiment of the present invention. As previously described, the present invention describes a roll-formed beam having a constant longitudinal cross section, and which is reformed in a tubular or non-tubular shape, such as exhibiting a non-constant cross section, and using an additional process such as cold-twist, hot-twist, fixture-forming, hydro-forming, extruding or other known reforming processes. The present invention further teaches a beam and associated method for forming, and by which associated front and rear surfaces exhibit different radii and/or non-parallel surfaces.

Figures 3, 4:
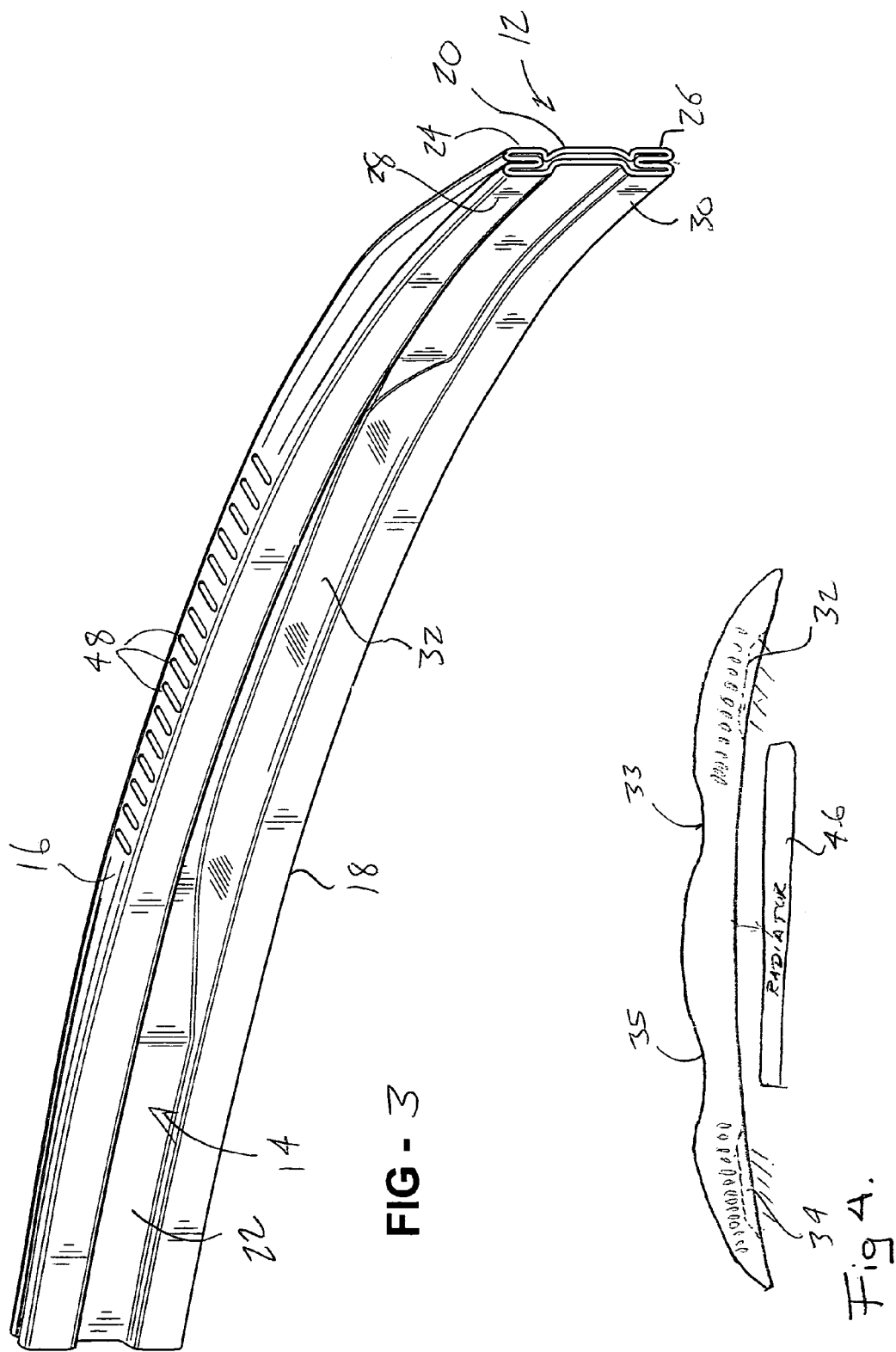
FIG. 3 is a sectional perspective of a second half of the bumper beam with crushed end profile, illustrated from a rear facing side and by which it exhibits an inwardly deflected rear facing surface, and such as which is associated with a mounting location associated with a vehicle.
FIG. 4 illustrates a top plan environmental view of the bumper beam according to the substantially to the configuration of FIG. 3 and illustrated representatively mounted to a front end location of a vehicle.

Referring again, to FIG. 1, as well as collectively to the top plan and rear sectional perspectives set forth in FIGS. 2 and 3, the roll-formed beam 10 (such as exhibiting 100 ksi or greater rated automotive steel) exhibits a front surface 12, an oppositely facing rear surface 14, an interconnecting top surface 16, and a likewise interconnecting bottom surface 18. The front 12 and rear 14 surfaces are illustrated generally in FIGS. 1–3, and it is understood that each may further include an extending and central planar section, see at 20 and 22 for surfaces 12 and 14, respectively, and which further separates upper and lower three-dimensional and tubular shaped sections. These are illustrated by surfaces 24 and 26 outwardly projecting and bounding central front surface 18, as well as surfaces 28 and 30 likewise outwardly projecting and bounding central rear surface 20.

A mounting section is located on each side of the center facing rear surface 22, approximate an outer end section of the bumper beam 10. As best shown in FIG. 3, inwardly depressed location 32 is positioned along rear planar section 22 (a corresponding opposite end location not being evident from the sectional view of FIG. 3 but further illustrated at 34 in FIG. 4) and such that the bumper beam 10 may be mounted in an even and flush manner to mounting hardware (not shown) projecting from a front (or rear) surface of a vehicle.

As will be described subsequently in additional detail, the reshaped roll-formed bumper beam exhibits a closed (or unclosed), non-constant section beam that permits profile changes along its side view and thus provides the ability to allow the appropriate crush (or inward displacement) in the end sections of the beam, as further generally illustrated at 36 and 38 in FIGS. 1 and 2; this while still providing vertical or near-vertical mounting sections, see again 32 and 34, between the central and outer end sections, and for purposes of rail attachment.

Figure 5:
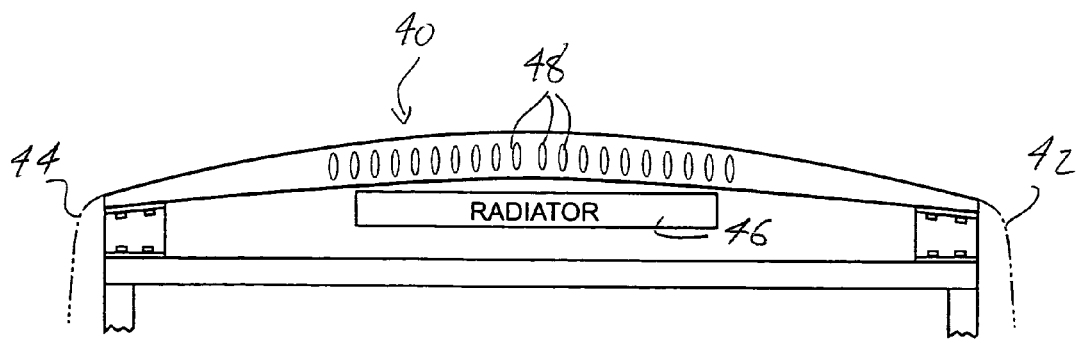
FIG. 5 is a top plan environmental view illustrating the bumper beam according to a further preferred variant of the present invention and likewise mounted to a vehicle.

In a preferred embodiment, the reshaped roll-formed beam 10 is extended in one longitudinal direction axis (see as shown in FIGS. 2 and 3) and shaped as a tube with an optional closed cross section. It is here that the end sections 36 and 38 of the bumper beam can be "crushed" (or inwardly displaced) rearwardly along an X axis, and to mimic the vehicle's fascia slope. By example, reference is made to a mounting configuration of a bumper beam generally referenced at 40 in FIG. 5, and by which corresponding edge locations of the beam meet with the vehicle fascia components 42 and 44 and in order to match or "mimic" the vehicle's fascia profile slope. As is also shown, the arcuate configuration imparted to the beam 10 also accommodates the positioning and placement of such vehicle components as its radiator (see at 46 in FIGS. 4 and 5) and the like.

It is further understood that the "crushing" or inward displacement of the forward end surfaces, as shown in FIGS. 1–3, illustrates only one of many forming operations, which are made possible by the present invention. Along these lines, it is envisioned that the inwardly (rear) depressed locations 32 and 34 result from a likewise inward deflection or deformation process. Referring again to FIG. 4, additional front edge locations, see at 33 and 35, can likewise be inwardly recessed utilizing this process. An aspect of the invention is the ability to inwardly deflect either or both the front and rear facing surfaces of the bumper beam, such as in a single step which is concurrent with its forming/quenching operation, and to thereby provide the beam with either or both non-parallel surfaces and non-constant radii at given locations.

Referring again to FIGS. 1–3, and referencing in particular each of the selected and enlarged end sections 36 and 38, each of the flattened or "crushed" configurations represents the front wall 12 being displaced in a direction towards the rear wall 14, without affecting the shaping of the rear wall and so that its associated sweep aspect (in relation to the vehicle) is unaffected. Additionally, the walls formed at the areas indicated allow for efficient "crush" displacement of the front walls and the creation of a variable profile allows for optimization of the performance to weight ratio associated with the bumper beam 10.

In a preferred embodiment, the end formations are accomplished in a same operation as the forming and quenching of the bumper beam design. In this manner, a lower radius sweep is attainable beyond that which has been previously possible with conventional bumper formation methods.

Additional features include the provision of a plurality of spaced apart and transversely extending beads (see at 48) or other suitable protuberances, and which are intended to increase the buckling strength of the beam design 10. In a preferred embodiment, the beads 48 are formed at given locations along the top surface 16 and are also intended to allow for the use of lower gauge materials and the creation of a resultantly lighter product.

The benefit of the "crush" end configuration as illustrated is that it represents the "un-crushed" profile of a normal roll-formed tubular swept beam mounted in respect to a vehicle's fascia. The outer end "crush" (again at 36 and 38) allows the roll-formed bumper beam to be mounted to the non-constant bumper cover curvature closer than previously tried due to the gradual "crush" crush or flattening of the end section.

As a result of the "crush," there is less spacing between the vehicle's fascia and the "crushed" roll-formed bumper beam 10 (FIG. 1). Therefore, less filler (i.e., foam) is required is required in the bumper system, thereby reducing vehicle costs and offering the best possible energy absorption during the collision. Additional desired features include the ability to match the overall bumper shape or styling to match a desired theme of the vehicle, as well as again to provide adequate clearance to the vehicle radiator or other engine components to be protected.

Figure 6:
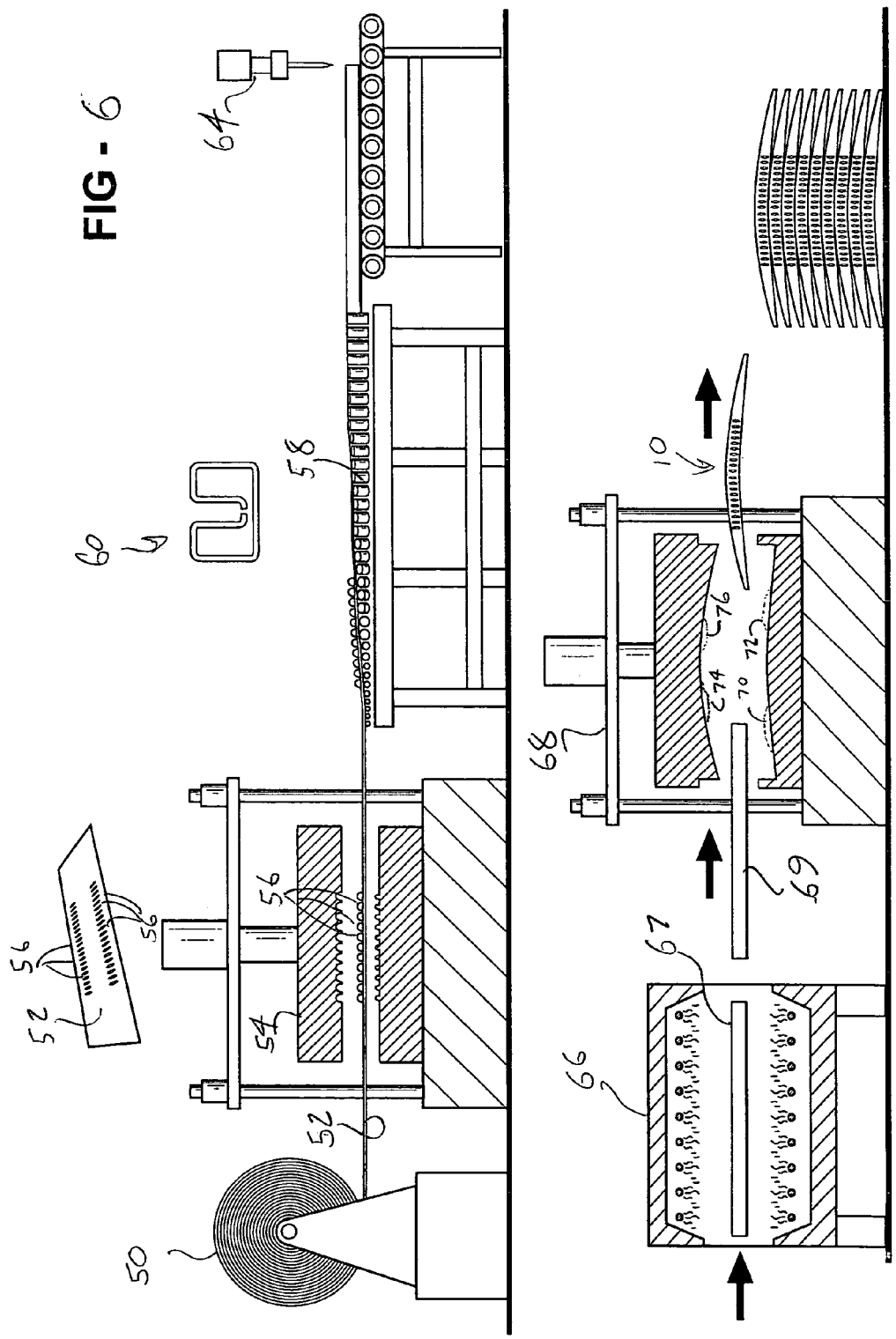
FIG. 6 is a schematic illustration of a forming process associated with the creation of the bumper beam design according to the present invention.

Referring further to FIG. 6, a schematic illustration is shown of a forming process associated with the creation of the bumper beam design according to the present invention. In particular, the roll of the steel (or other suitable metal) is illustrated at 50, and from which the material is unreeled in sheet form and as shown at 52 (as well as in the associated and exploded sectional illustration of a selected running length of roll material rotated in 3D perspective).

At step 54, a stamping process is applied to the unreeled steel roll and such as which forms the plurality of spaced apart and transverse extending beads, see as illustrated here at 56, and which correspond to the placement of beads 48 in the finished bumper beam 10 of FIGS. 1–5. The stamping process is typically comprised by male and female compressing dies, as shown, and which result in a desired depressed or embossed pattern being applied to the sheet 52.

In the illustration of FIG. 6, the transverse extending beads 56 are shown extending along opposite side edges of the unrolled sheet, it being further understood that the beads can be formed along any location of the sheet and at any desired spacing or interval and in order to define a desired and given pattern in the final roll-formed and 3D shaped beam.

Figure 7:
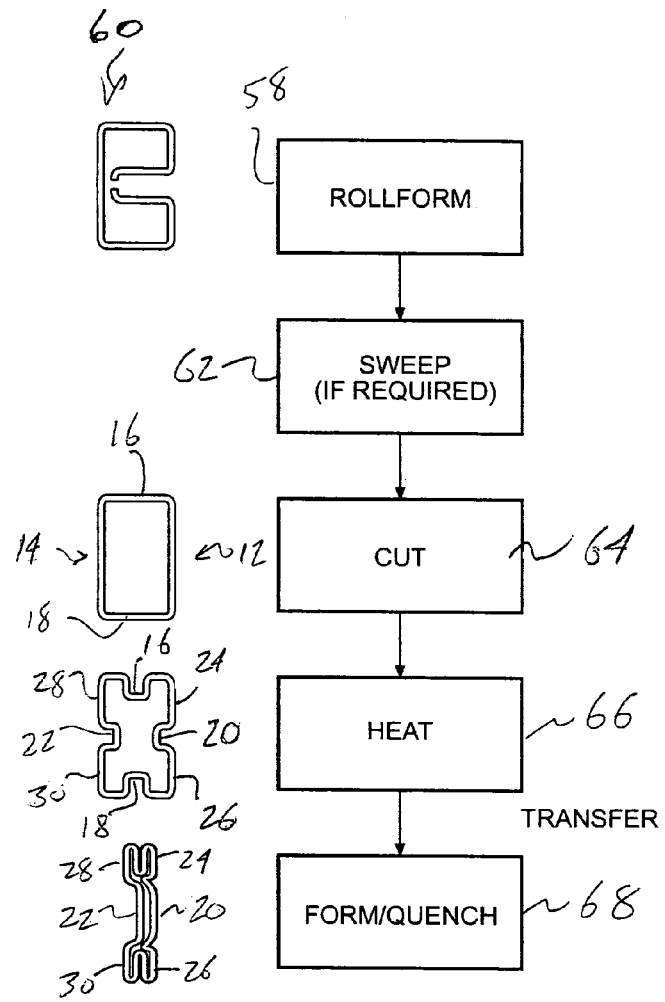
FIG. 7 is a diagrammatic illustration of the forming steps illustrated schematically in FIG. 5 and which are associated with the creation of a bumper beam according to the present invention.

Step 58 illustrates a roll-form/weld operation (see as also designated by like reference numeral in the diagrammatic view of FIG. 7) in which the steel roll is reconfigured in a generally tubular shape exhibiting a closed cross section, as illustrated generally at 60 in each of FIGS. 6 and 7. The optional closed cross section is obtained by welding together by spot-welding, seam welding, or a similar method, the edges of the plate, which after the roll-forming, meet and make contact with each other.

The roll-forming device can shape bends, longitudinal grooves in a sheet in order to make the further shaping of the bumper beam possible, and also to improve the final torsional rigidity, flexural rigidity, and other properties of the bumper beam that take up forces during a collision. In a preferred embodiment, any desired sweeping of the beam can be performed, at step 62 as indicated in FIG. 7 and, following roll-forming, the sheet 52 can be cut into suitable lengths, see blade 64 which ensures as small a length of the bumper beam as is desired. The sheet can also be cut prior to the roll-forming operation and within the scope of the invention.

A succeeding heating stage, see as designated at 66, softens the roll-form material (to a sufficient austenizing temperature and which is of sufficient degree to render it pliable). Reference is again made to FIG. 7 which illustrates, in side-by-side fashion to the relevant forming steps, the progressive cross-sectional configuration of the beam.

Once each succeeding bar, see as shown at 67, 69, et seq. in FIG. 6, has reached a correct temperature, it is placed in a combined forming and quenching tool 68, by which individually sectioned lengths of material are bent/swept into an overall profile shape, illustrated finally again at 10, this combined with the simultaneous inward deflection, or crushing of the first and second ends 36 and 38, respectively, in the manner previously described. As is also referenced in phantom, additional configurations 70, 72, 74 and 76 may be defined within the opposing forming surfaces of the associated forming/quenching tool 68 and by which the desired crushed (or recessed) configurations 32 & 34 and 33 & 35 can be applied to the front and rear faces of the beam (see again FIG. 4), and such as in particular to the corresponding front and rear central planar sections of the roll formed beam.

In this manner, it is also envisioned that the shape of the roll-formed bumper beam can be altered at the all sections, center, mounting or end, and in order to facilitate the mounting of the beam onto the vehicle. The changes in the bumper beam's shape take place in a controlled manner, for example in a forming tool. Other options include welding the roll-formed bumper beam to form a tubular beam through the center section, the mounting sections, and continuing to the outer end sections.

The "crush" and optional welding further implies that the bumper beam has different energy absorbing properties in this region, than perhaps it possesses at its center. The region of the optional welded joint constitutes a clear rotational guide for the bumper beam during a collision. The bumper beam will be more easily broken in its distinct region and in this way absorbs large amounts of energy.

In use, the roll-formed bumper beam 10 is mounted horizontally to the front end of the vehicle, as well as to the front ends of the sidebars of the vehicle. The mounting of the bumper at the sidebars is accomplished in a manner selected from the generally known art. When the bumper beam has been mounted onto the vehicle, its main task is to resist, distribute, and dissipate the energy that is absorbed during a collision between the vehicle and another object. The bumper beam should mainly manage those forces that act on the vehicle during a collision, either directly or obliquely from the front.

In addition to the crush forming operation, the roll-formed bumper beam is shaped along its horizontal axis Y by bending. The bumper beam is relatively straight when it comes out from the roll-forming device (see again representation 60 in FIGS. 6 and 7). The front of a vehicle's fascia is often bent backwards out towards the sides of the vehicle in order to reduce air resistance, to improve the properties for absorbing collision forces and to make the appearance attractive. The bumper beam should have an equivalent bending in order to optimize the use of available space. The ends of the bumper beam are bent backwards with the same forming tool that carries out the pressing together.

In a preferred application, and after shaping, the bumper beam is quenched still located in the forming tool. This method gives a bumper beam that is constructed in one piece and that only requires one roll-forming device and only one further forming device, which shapes the details and at the same time provides the bumper beam with the stability during quenching.

The reshaped roll-formed bumper beam construction exhibits an optional closed profile whose geometry is selectively varied as positioned across a vehicle typically made by roll-forming. This bumper construction is canted forward or rearward along its centerline or at its ends or at any intermediate position that allows the bumper to better fit the space underneath the vehicle exterior (the beam is canted forward or rearward as related to its mounting points).

The present invention contemplates the ability to deflect or collapse either of the front and rear extending faces, at any axially extending location, and to achieve a one-piece roll-form profile or extruded profile curvilinear beam with front and rear surfaces exhibiting different radii and non-parallel surfaces.

It is also envisioned, within the scope of the invention, to have other solutions and detailed designs of the certain parts of the bumper beam. The number, appearance, and construction of the grooves and bends can also be varied and complemented in order to control and vary the collision properties of the bumper beam. Accordingly, this detailed description is not to be seen as a limitation of the invention; it should rather be seen as a guide to a full understanding of the invention in all its parts.

An associated method for forming a beam exhibiting non-parallel and opposing surfaces is also disclosed and, as most broadly recited, includes the steps of unreeling, in sheet form, a selected running length of a roll material, forming the steel roll into a generally three-dimensional and tubular shape exhibiting a closed cross section, heating the tubular shaped material, and inwardly displacing at least one of first and second opposing surfaces associated with the tubular shaped material, relative to one another, and concurrent with imparting an overall arcuate shape to the material. Additional steps include inwardly displacing first and second front end surfaces, and in a direction towards associated rear surfaces, thereby reducing a cross-sectional area associated with each of the first and second ends, as well as inwardly displaced mounting locations formed within the rear surface and proximate the first and second ends.

Yet additional steps include applying a combined forming and quenching operation, by which individually sectioned lengths of material are bent into an overall profile shape, as well as stamping a plurality of spaced part and transverse extending beads along at least one of the front and rear facing surfaces. Further steps include forming a central planar section separating upper and lower three-dimensional and tubular shaped sections, as well as sectioning, into individual lengths, the unreeled roll material and subsequent to forming into the desired three-dimensional shape.

It is therefore evident that the present invention provides a bumper beam design exhibiting a one-piece tubular configuration for ease of manufacture utilizing any desired hot or cold forming, squeezing, extruding or other suitable bending operation. The high strength imparted to the beam resists impact loads, through its three-dimensionally formed geometry, while at the same time being generally lightweight. The present invention further makes possible the use of low cost and readily available steel, capable of being mass produced.

Having described my invention, other and additional preferred embodiments will become apparent to those skilled in the art to which it pertains and without deviating from the scope of the appended claims.

We claim:

1. A formed beam for use as a vehicle bumper, comprising:
    an elongated body having front and rear opposing surfaces, top and bottom surfaces interconnecting said front and rear surfaces and defining a swept shape between first and second opposite ends;
    said front surfaces corresponding with said first and second ends being displaced rearwardly in a direction towards said rear surfaces, reducing a cross-sectional area associated with each of said first and second ends such that said bumper, upon being secured to a vehicle front end, more closely aligns with corresponding vehicle fascia components; and
    at least a portion of one of said front and rear surfaces being inwardly displaced in a direction towards an opposing surface, during formation of said beam, said front and rear surfaces exhibiting at least one of non-parallel surfaces and non-constant radii at certain locations.

2. The beam as described in claim 1, said roll-formed beam exhibiting an extending and central planar section separating upper and lower three-dimensional and tubular shaped sections.

3. The beam as described in claim 1, further comprising first and second inwardly displaced mounting locations formed within said rear surface and proximate said first and second ends.

4. The beam as described in claim 1, said beam exhibiting a specified shape and size and being constructed of a steel exhibiting at least a 100 ksi rating.

5. A formed beam for use as a vehicle bumper, comprising:
    an elongated body having front and rear opposing surfaces, top and bottom surfaces interconnecting said front and rear surfaces and such that said beam defines a swept shape between first and second opposite ends, said body further comprising a structural steel exhibiting at least a 100 ksi rating;
    a plurality of spaced apart and transverse extending beads being formed upon said top extending surface of said beam; and
    at least a portion of one of said front and rear surfaces being inwardly displaced in a direction towards an opposing surface, during formation of said beam, and such that said front and rear surfaces exhibit at least partially non-parallel surfaces.

6. A formed beam for use with a vehicle bumper, comprising:
    an elongated body having front and rear opposing surfaces, top and bottom surfaces interconnecting said front and rear surfaces and defining a swept shape between first and second opposite ends;
    a plurality of spaced apart and transverse extending beads being formed upon a selected extending surface of said beam; and
    at least a portion of one of said front and rear surfaces being inwardly displaced in a direction towards an opposing surface, during formation of said beam, said front and rear surfaces exhibiting at least one of non-parallel surfaces and non-constant radii at certain locations.

* * * * *